(12) United States Patent
Huo

(10) Patent No.: US 7,607,158 B2
(45) Date of Patent: Oct. 20, 2009

(54) ELECTRONIC INFORMATION ITEM SELECTION FOR TRADE AND TRADED ITEM CONTROL DELIVERY SYSTEM

(76) Inventor: Shuya Huo, 30 N. 13$^{th}$ St., Apt. #8, San Jose, CA (US) 95112

( * ) Notice: Subject to any disclaimer, the term of this patent is extended or adjusted under 35 U.S.C. 154(b) by 237 days.

(21) Appl. No.: 10/519,393
(22) PCT Filed: Apr. 14, 2003
(86) PCT No.: PCT/US03/11320
§ 371 (c)(1), (2), (4) Date: Nov. 13, 2006
(87) PCT Pub. No.: WO03/090464
PCT Pub. Date: Oct. 30, 2003

(65) Prior Publication Data
US 2007/0088614 A1    Apr. 19, 2007

(30) Foreign Application Priority Data
Apr. 16, 2002    (CN) .............................. 02 1 16861

(51) Int. Cl.
*H04N 7/173* (2006.01)
*G06Q 30/00* (2006.01)
(52) U.S. Cl. .................. 725/104; 705/26; 725/60; 709/203; 709/219
(58) Field of Classification Search .................. None
See application file for complete search history.

(56) References Cited

U.S. PATENT DOCUMENTS 5,956,716 A * 9/1999 Kenner et al. ............. 707/10
6,088,722 A * 7/2000 Herz et al. ................. 709/217
2002/0053076 A1 * 5/2002 Landesmann ............. 725/10
2002/0053080 A1 * 5/2002 Gruhl et al. ............... 725/38
2003/0083943 A1 * 5/2003 Adams et al. ............. 705/14
2007/0044010 A1 * 2/2007 Sull et al. ................ 715/500.1

OTHER PUBLICATIONS

Loebbecke, C., Electornic trading in on-line delivered content, Jan. 5-8, 1999, vol. Track5, pp. 1-10 http://ieeexplore.ieee.org/stamp/stamp.jsp?tp=&arnumber=772912&isnumber=16785.*

* cited by examiner

*Primary Examiner*—Brian T Pendleton
*Assistant Examiner*—Pinkal Chokshi
(74) *Attorney, Agent, or Firm*—The Merek Group, Inc.; Joseph C. Merek

(57) ABSTRACT

The objective of this invention is to provide a solution that enable real, delayed or relayed time trade and delivery of time-tagged electronic information items from/among same or different regions' information content providers (190a, 190b) and/or their subscribers (201, 202, 211, 212, 221, 222), or via their corresponding region's information content network operators and their subscribers (201, 202, 211, 212, 221, 222). In order to realize the objective, this invention provide a system to select wanted information items and package the unselected or for-not-use information items in specified time frame by mapping and grouping via a grid/matrics to packaging, labeling and pricing the items into for-trade-items or dealpacks and register them into trading database (200); a system for dealpack listing, online searching and purchasing; and dealpack's secret key submitting, verifying, encrypting transmission and decrypting delivery.

19 Claims, 4 Drawing Sheets

ELECTRONIC INFORMATION ITEM SELECTION FOR TRADE AND TRADED ITEM CONTROL DELIVERY SYSTEM

FIELD OF THE INVENTION

The field of this invention relates to an electronic information item selection for trade and the traded item control delivery system, more particularly, it relates to a system that selects, maps, groups, packages, labels and prices media/television information items by time and content. The system includes classifying, indexing, listing, searching and purchasing; as well as a control system for subscriber's secret key issuance, submission, authorization, and management of the secret key; encryption of the content for transmission, and decryption of the content for delivery and display.

BACKGROUND OF THE INVENTION

U.S. Pat. Nos. 6,028,599 and 6,341,195 describe an electronic program guide and its data base system; U.S. Pat. No. 6,088,722 describes a personalized TV program selection system. Although these patents relate to an electronic program guide and program selection systems, the purpose of those system are all for watching pre-selected and recorded program at later time, while never touch the subject of the present invention. U.S. Pat. No. 6,058,417 describes a subscriber to subscriber electronic trading system on the internet, and U.S. Pat. No. 6,226,675 described a corporate group to corporate group electronic online trading system. These systems are all set up for conventional physical goods trading, there is not yet a real or delayed or relayed time trading system for trading electronic information items, such as TV programs, media, and information products.

Currently, electronic information (such as TV programs) items are provided by information content providers to information content network operators, who assemble the information content by channels and sell to subscribers on a monthly subscription basis. A content provider can sell its own content to many content network operators; a content network operator can have its own mass subscriber base in a region, but content providers in most cases do not have a real time supply relationship with the subscribers associated with a content network operator; due to limitation of territory, the network operator only provides monthly service to its subscribers within its own network area. Subscribers who pay the monthly subscription fee are provided with the subscribed content (such as TV programs) which is typically composed of several hundred channels; and in certain time frames (such as several days or certain day) the subscriber may only use a portion of the content (such as only watch several or tens of channels), the content for the rest of the time (or rest of channels) are wasted. In other cases, due to the internet technology development, if a content provider provides content directly to world wide subscribers via internet by the method of streaming SVOD (Subscription Video on Demand), though the quality is still in question, it breaks the area limitation of regional network's operation and some even bypass the network operation. Similarly, a satellite direct broadcast network operator is not restricted by terrestrial limitations. Both SVOD providers and satellite direct broadcast network operators all encounter the limitation of various nations' government administration policy and media import and export control as well as content usage when their content is delivered to these controlled areas. Since one subscriber can only use one or several channels of media at time, while they own the access right to the content network operator's authorized media pool, which may contains hundreds or thousands of titles or channels of information or media. When the subscriber only uses certain number of titles or channels of media in certain time, the rest of the title or media within or beyond the specified time shall be idle or wasted.

SUMMARY OF THE INVENTION

The objective of this invention is to provide a trading system that will enable trading of electronic information items (i.e. media/television electronic information items commonly referred to as content). The trading system provides electronic information content providers and network operators with the ability to trade their content via their subscribers. The content providers and network operators who desire to trade their content may be in the same area or different areas and will have the ability to trade their content in real, delayed, or relayed time. This can be accomplished with content providers in other areas via their corresponding electronic information content network operators in their respective areas or directly through a trading network exchange server and deliver the content in a secured manner. To realize the objective, the invention provides a system for trading electronic information items. The system includes a process for selecting electronic information items for trade, transforming the for trade electronic information items into trading packages or dealpacks, and controlling delivery of the dealpacks. In one preferred embodiment, the system includes a control device, such as client side TV set-top box, a computer, a handheld PC, PDA, server side cable head-end, telecom node, or computer hub, on which an electronic program item selection software means can be downloaded/upgraded. The software means for selecting electronic program items conducts the selection of the electronic information items by their specified time frame and content. The packaging process or system (can be called the pack-engine) then maps and groups the remaining (for trade) items in accordance with a pre-defined grid/matrix into trading packages or dealpacks. Label data and price information are incorporated into the trading packages or dealpacks by the packaging process. The dealpacks are listed for trade (which may occur in real, delayed, or relayed time). The system includes a trading network center for controlling dealpack indexing, listing, searching, trading, charging and billing as well their encryption for transmission and decryption for delivery and display.

The above software means for selection of electronic information items (such as TV programs) includes an interactive electronic program selection guide (EPG). Such a selection guide could be interactively operated via a control device, such as set-top box, a computer, and/or handheld device, that includes a rolling display of the listing/guide on TV/PC or via internet web pages directly or through internet channel. A user makes a selection via the selection guide (such as EPG), which may include the time frame or time frame group, or item (such as program channel/title or channel/title combination), which are listed by pre-defined format. When selecting items, a user can press keys on a pad (such as computer or phone), buttons on a control unit (such as a remote control, a mouse, or a touch panel), or use touch pen to select some items as for-use and others for trade (where they may be rented, leased, or sold, etc.) in a specified time frame. Also a user can select to further display some label information (such as program briefing, author, publishing date etc.). Once determined, the items for trade shall be immediately mapped into a pre-defined grid/matrix for regrouping and pricing by the pack-engine on the server side, where they are then put into trading status. The pack-engine is a packaging process or system that transforms the for-not-use content into dealpacks as seen in FIG. 1. This status shall be the authorization from the user to their content/network operator to send those for trade items into a regional trading database server, which is linked with the trading database exchange server and updated in real time to enable internal (trading among the content/network operator's own subscribers) or external (trading with subscribers of other networks) trading.

The trading system includes regional log-on servers which are linked with the trading exchange server. The regional servers provide localized web interface for log-on by the local network operator and its subscribers and provide a classified listing area (such as on the internet or cable network) for the dealpacks. They also allow searching, selection, and purchase of the dealpacks which can be accomplished by key words, class, and operators names by registered log-on local or related other regions' subscribers. The trading system operator is in charge of the administration and operation of the trading database and servers, including registering content/network operators and their subscribers, providing log-on authorization, online search system maintenance, trading settlement, secret key issuance/release, and management of the drop-in subscribers' control device (such as set-top box or network card), sales, and their log-on authorization. Once the content network operator has registered its subscribers on the trading network, they can then link to the time-tagged for trade trading dealpack database server to the trading exchange servers for listing out. The operator's subscribers and drop-in users can then search the listed dealpacks and make purchases. For one preferred embodiment of the invention, the search results could be a list and include the price of the dealpacks. If a user clicks on a certain dealpack, it can further display its labeling data, such as program titles, authors, directors, main actor/actress, brief description of the program, publishing dates, pictures, previews and time for play, etc. Once purchased, the trading center can use credit/debt (where they may settle the account with the operators monthly), or use a credit card/bank card as payment tool to close deal online. Once paid, the purchaser shall be given a secret key, which could be administered by the trading center on behalf of the purchaser to deliver the dealpack to the purchaser by scheduled time, or the secret key could be submitted by the purchaser him/herself via internet, cable or wirelessly to activate the dealpack delivery and display of its content.

The secret key for each dealpack is generated by an algorithm of assembling the selling-subscriber's key, time frame identifier and identifier of the dealpack as well as verifier of payment for the dealpack.

The control device may be a set-top box type device, remote handheld PC, PDA, server side cable head-end, telecom node, or computer hub. The control device operates together with the trading network's subscriber administration, network administration and billing system to provide the purchased dealpack encryption and decryption chain and delivery conduit to the purchaser. The method includes the steps of: downloading the EPG software means; selecting items for-use and confirming the items for trade; send the items for trade to the pack-engine for packaging, pricing and sending out to trading exchange server via the database server for listing. The purchaser searches through the listed dealpacks and purchases the secret key for the dealpacks they selected. The network administrator controls and authenticates the secret key, encrypts and transmits the dealpack. Subscribers on the same network trade with each other via the network center to verify the secret key and issue a pass to let control devices, such as a set-top box or a network card release and deliver the dealpack; while subscribers on different network trade each other via network center/gateway and set-top box together to verify the secret key and issue a pass to deliver the dealpack.

The objective and characteristics of the invention will become apparent from the following drawings and the detailed description.

DETAILED DESCRIPTION

Figure 1:
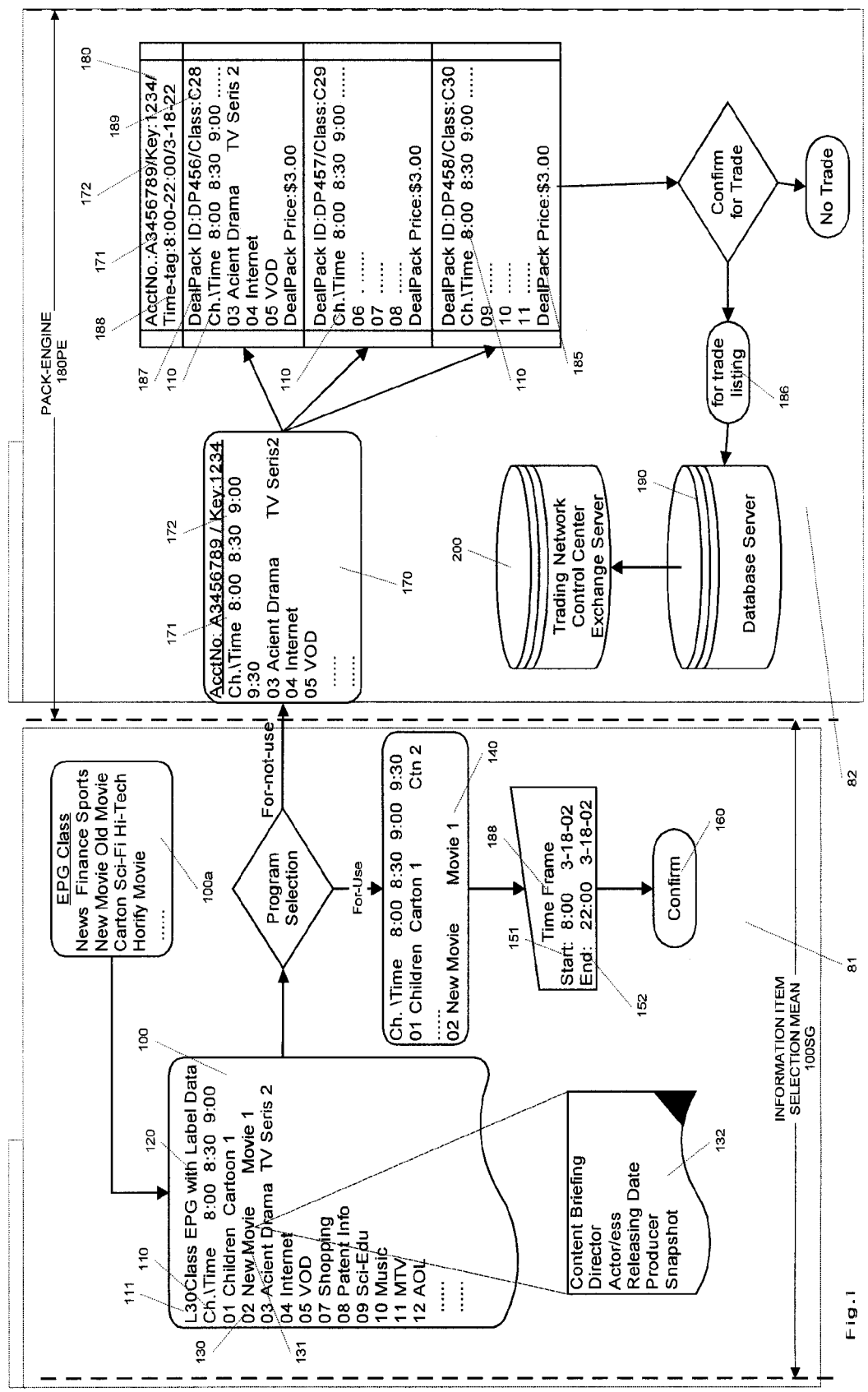
FIG. 1 is the overall flow chart of the information item selection and packaging into dealpack for listing on the trading network.

A preferred embodiment of the present invention is disclosed in the flow chart/block diagram as illustrated in FIG. 1. A user first selects the program they want to watch. They can start from a classification index 100a, use hand held control unit to select the items for-use 111, then they select from the EPG 100 the wanted channels 110 and its code or name 130. If they want to further understand the program, the subscriber can select the program 131, then a window 132 will open and it illustrates related information about the program. The subscriber can further select the time frame 188 based on the selected channel combination 140, including to input/select the starting time and date 151 and ending time and date 152, then confirm with 160. Once confirmed, under the account number 171 of the subscriber, the packaging system or pack-engine 18OPE will put all the rest (i.e. the remaining) of the channels/programs 170 into a pre-defined grid/matrix 180 for pricing 185 in accordance with the channel 110 and time frame 188 and show time 184 as well as dealpack ID 187, and class code 189. Upon confirmation for trade 186, the dealpacks 187 will be automatically be sent to the trading network database server 190 linking the trading network control center exchange server 200 for listing.

Figure 2:
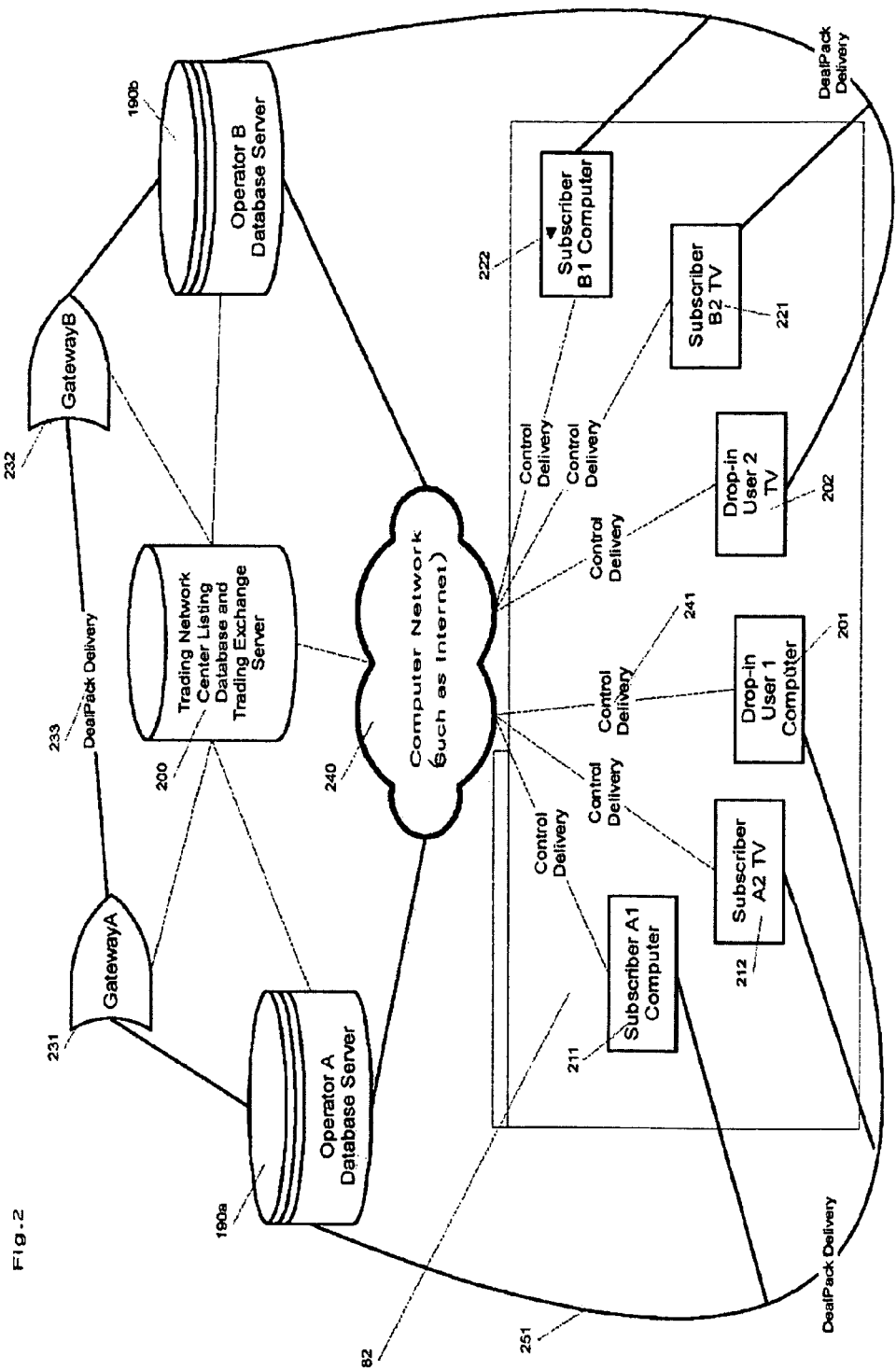
FIG. 2 is the overall block diagram of dealpack trading and delivery system.
Figure 3:
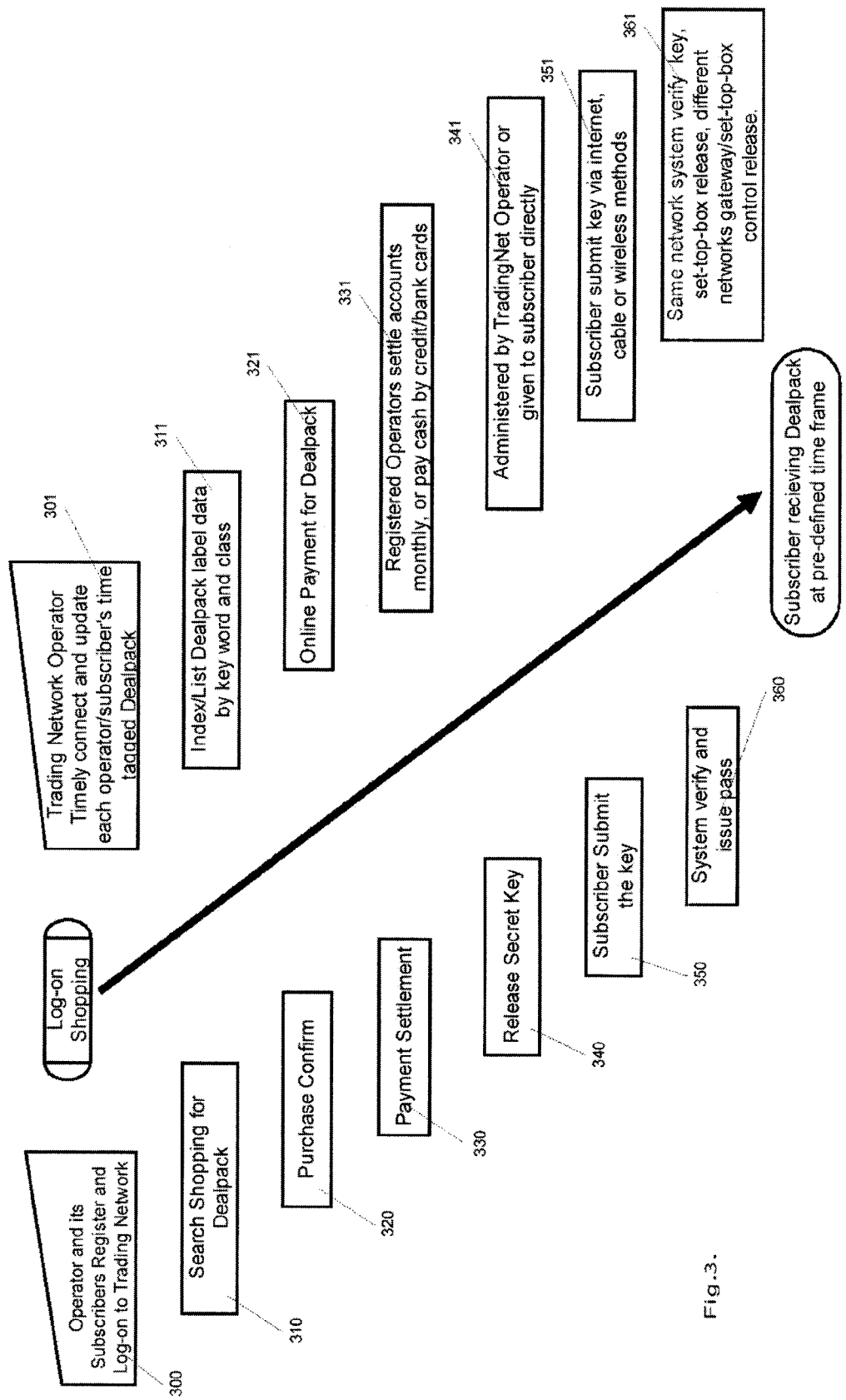
FIG. 3 is the process block diagram of the dealpack search, selection, purchase and receiving by a user of the trading system.
Figure 4:
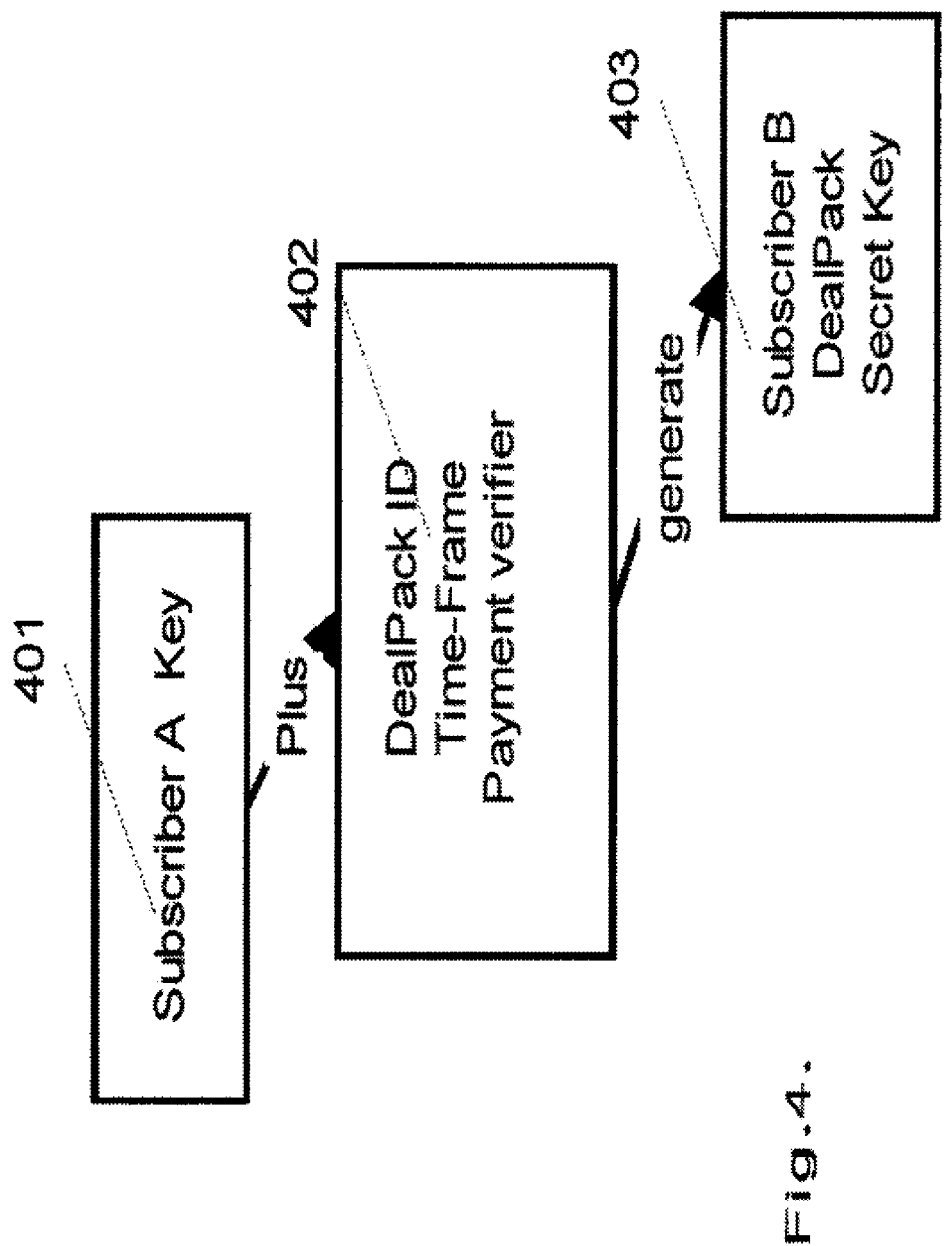
FIG. 4 is the block diagram of dealpack secret key assembling and generating method

FIG. 2 is an illustration of the trading system where two content/network operators are associated with the trading system through the trading center 200. The trading center includes a listing database and an exchange server. Before dealpack trading can begin, content/network operator A and content/network operator B register and log-on to the trading network center 200. The subscribers associated with these content/network operators are automatically registered on trading network. FIG. 3 shows the steps for purchasing a dealpack which begin with the step where the content/network operators log-on to the trading network (step 300) through dealpack release (step 361). Database servers 190a and 190b are linked with the trading network center 200. The subscribers associated with content/network operators A,B are connected into the trading network center 200 via their operating device. Specifically, subscriber A1 associated with content/network operator A is connected to the trading network center 200 by their computer 211. Subscriber A2 is connected by their TV. Drop in subscriber 1 and drop in subscriber 2 are not associated with either content/network operator. Drop in subscriber 1 is connected to the trading network center by computer 201 and drop in subscriber 2 is connected by TV 202. The trading system supports a variety of different users, some of which have access to content (subscribers a1, a2, b1 and b2 seen in FIG. 2) and those who only have access to content through the trading network center 200 (drop-in user 1 and drop-in user seen in FIG. 2)

It is to be understood that the above preferred embodiment of the invention is only illustrated the key concept and composition of this invention, many variations and modification can be made based on the accent of the above embodiment, which will be apparent to one skilled in the art, that are also within the spirit and scope of the invention as set forth in the claims below.

What is claimed is:

1. A method for trading electronic information items, the method comprising:
    providing an electronic information item trading system;
        said trading system including:
            a trading center with a trading database server and a trading exchange server;
            a selection process, a packaging process, and a control delivery process;
    providing the trading center access to a network to enable trading of the electronic information items;
    having at least one network operator associated with the trading system, where each of said at least one network operator delivers content through their network that is available through subscription;
    providing a control device for executing the selection process and the control delivery process;
    the system capable of supporting a plurality of users and enabling the users associated with the network operator the ability to trade content to which they subscribe, wherein users who complete the selection process are identified as selling subscribers and users who acquire at least one dealpack are identified as buying subscribers;
    the selection process including:
        wherein when one of the selling-subscribers identifies and selects content for their use and directs the remaining content which is identified as for-not-use to the packaging process;
    the packaging process transforming the for-not-use content into dealpacks;
    providing a plurality of gateways on the network, the gateways controlling the path of the dealpacks;
    listing the dealpacks on the trading system where the users of the trading system have access to the dealpacks;
    a control delivery process for delivering traded dealpacks including:
        receiving a payment for the traded dealpack;
        generating a secret key for the traded dealpack;
        submission and verification of the secret key;
        delivering the traded dealpack to the buying subscriber upon verification of the secret key.

2. The method of claim 1, further including:
    employing an interactive electronic program guide in the selection process.

3. The method of claim 1, further including:
    employing a browser in the selection process.

4. The method of claim 1, the packaging process including:
    receiving the remaining content of electronic information items upon completion of the selection process;
    mapping each of the electronic information items into a predefined matrix via the transforming and reorganizing process which regroups and indexes the electronic information items into the dealpacks;
    incorporating label data and pricing information into each dealpack;
    each dealpack having an account number associated therewith, wherein the account number relates to the user who directed the not-for-use content to the packaging process;
    assigning an identification code to each of the dealpacks; and
    sending the label data and pricing information of each dealpack to the exchange server for listing and trading.

5. The method of claim 1, the secret key is generated by the following steps:
    providing an algorithm to generate the secret key;
    said algorithm generating the secret key by assembling and encrypting the following items:
        a key from the selling subscriber;
        a time frame associated with the dealpack,
        an identification associated with the dealpack; and
        verifier of payment of the dealpack.

6. The method of claim 1, wherein the control device is selected from the group consisting of a TV set-top box, a computer, a handheld PC, a PDA, a server side cable head-end, a telecom node, and a computer hub.

7. The method of claim 4, the secret key is generated by the following steps:
    providing an algorithm to generate the secret key;
    said algorithm generating the secret key by assembling and encrypting the following items:
        a key from the selling subscriber;
        a time frame associated with the dealpack,
        an identification associated with the dealpack; and
        verifier of payment of the dealpack.

8. The method of claim 4, wherein the mechanism for submitting the secret key is selected from the group consisting of internet, wire, cable, and wireless; wherein the secret key is submitted by the group consisting of the trading center and the buying user.

9. The method of claim 8, wherein upon verification of the secret key, a pass is issued to allow delivery of the dealpack.

10. The method of claim 1, wherein the trading packages are encrypted for transmission and decrypted upon delivery.

11. The method of claim 6, the secret key is generated by the following steps:
    providing an algorithm to generate the secret key;
    said algorithm generating the secret key by assembling and encrypting the following items:
        a key from the selling subscriber;
        a time frame associated with the dealpack,
        an identification associated with the dealpack; and
        verifier of payment of the dealpack.

12. The method of claim 1, including a database server associated with each of said at least one network operator.

13. The method of claim 1, where trading may occur in real, delayed, or relayed time.

14. The method of claim 1, a database server associated with each of said at least one network operator, an exchange server associated with the trading system.

15. A method for trading electronic information items, the method comprising:
    providing an electronic information item trading system;
        said trading system including:
            a trading center with a trading database server and a trading exchange server;
            a selection process, a packaging process, and a control delivery process;
    providing the trading center access to a network to enable trading of the electronic information items;

having at least one network operator associated with the trading system, where each of said at least one network operator delivers content through their network that is available through subscription;

providing a control device for executing the selection process and the control delivery process;

the system capable of supporting a plurality of users and enabling the users associated with the network operator the ability to trade content to which they subscribe, wherein users who complete the selection process are identified as selling subscribers and users who acquire at least one dealpack are identified as buying subscribers;

the selection process including:
wherein when one of the selling-subscribers identifies and selects content for their use and directs the remaining content which is identified as for-not-use to the packaging process;

the packaging process transforming the for-not-use content into dealpacks;

listing the dealpacks on the trading system where the users of the trading system have access to the dealpacks;

a control delivery process for delivering traded dealpacks including:
receiving a payment for the traded dealpack;
generating a secret key for the traded dealpack;
submission and verification of the secret key;
delivering the traded dealpack to the buying subscriber upon verification of the secret key.

16. The method of claim 15, further including:
employing an interactive electronic program guide in the selection process.

17. The method of claim 15, further including:
employing a browser in the selection process.

18. The method of claim 15, the packaging process including:
receiving the remaining content of electronic information items upon completion of the selection process;
mapping each of the electronic information items into a predefined matrix via the transforming and reorganizing process which regroups and indexes the electronic information items into the dealpacks;
incorporating label data and pricing information into each dealpack;
each dealpack having an account number associated therewith, wherein the account number relates to the user who directed the not-for-use content to the packaging process;
assigning an identification code to each of the dealpacks; and
sending the label data and pricing information of each dealpack to the exchange server for listing and trading.

19. The method of claim 15, the secret key is generated by the following steps:
providing an algorithm to generate the secret key;
said algorithm generating the secret key by assembling and encrypting the following items:
a key from the selling subscriber;
a time frame associated with the dealpack,
an identification associated with the dealpack; and
verifier of payment of the dealpack.

* * * * *